(12) United States Patent
Cohen

(10) Patent No.: US 6,739,331 B1
(45) Date of Patent: May 25, 2004

(54) CHARCOAL DISPENSING SYSTEM

(76) Inventor: Frederick Cohen, 2502 N. Douglas St., Philadelphia, PA (US) 19132

( * ) Notice: Subject to any disclaimer, the term of this patent is extended or adjusted under 35 U.S.C. 154(b) by 0 days.

(21) Appl. No.: 10/455,949

(22) Filed: Jun. 6, 2003

(51) Int. Cl.[7] .................................................. F24B 1/08
(52) U.S. Cl. ........................ 126/283; 126/276; 220/2; 110/108
(58) Field of Search .................. 126/73, 68, 283, 126/25 R, 276; 110/108, 117, 118, 105, 109; 222/251, 305; 414/147, 204, 160, 199; 220/2, 7, 503; 206/96; 232/43.3, 43.5, 43.1

(56) References Cited

U.S. PATENT DOCUMENTS

| | | | | |
|---|---|---|---|---|
| 649,471 A | * | 5/1900 | Nelsen | ........................ 126/283 |
| 988,932 A | * | 4/1911 | Eberman | ...................... 126/283 |
| 1,458,024 A | * | 6/1923 | Benson | ........................ 126/283 |
| 1,957,097 A | * | 5/1934 | Dalen | ............................. 220/2 |
| 4,819,614 A | | 4/1989 | Hitch | |
| 4,966,125 A | | 10/1990 | Stephen et al. | |
| 5,611,447 A | * | 3/1997 | Tye | ................................. 220/2 |
| 6,173,644 B1 | | 1/2001 | Krall | |

* cited by examiner

*Primary Examiner*—James C. Yeung

(57) ABSTRACT

A charcoal dispensing system for storing and dispensing charcoal. The charcoal dispensing system includes a bin member being designed for receiving and storing charcoal. A dispensing assembly is coupled to the bin member. The dispensing assembly is designed for permitting charcoal to be dispensed from the bin member when the dispensing assembly is actuated by the user. A receiving member is selectively coupled to the bin member. The receiving member is in communication with the dispensing assembly whereby the receiving member is designed for receiving the charcoal dispensed by the dispensing assembly. The receiving member is designed for being carried by the user to dispense the charcoal into the grill.

13 Claims, 2 Drawing Sheets

CHARCOAL DISPENSING SYSTEM

BACKGROUND OF THE INVENTION

1. Field of the Invention

The present invention relates to charcoal storage devices and more particularly pertains to a new charcoal dispensing system for storing and dispensing charcoal.

2. Description of the Prior Art

The use of charcoal storage devices is known in the prior art. U.S. Pat. No. 4,966,125 describes a system for receiving and burning charcoal briquettes to cook food. Another type of charcoal storage device is U.S. Pat. No. 6,173,644 has an apparatus containing charcoal that is inserted into a gas burning grill to allow the charcoal to be burned to cook food in the gas burning grill. U.S. Pat. No. 4,819,614 has a duel fuel barbecue grill that can burn either gas or charcoal to cook food placed in the grill.

While these devices fulfill their respective, particular objectives and requirements, the need remains for a system that has certain improved features allowing for the storage and dispensing of charcoal.

SUMMARY OF THE INVENTION

The present invention meets the needs presented above by providing a bin member for storing the charcoal and a dispensing assembly coupled to the bin member to allow the charcoal to be dispensed from bin member.

Still yet another object of the present invention is to provide a new charcoal dispensing system that provides the user with a receiving member to allow the user to transport the dispensed charcoal without coming into direct contact with the charcoal.

Even still another object of the present invention is to provide a new charcoal dispensing system that keeps the charcoal dry to prevent the charcoal from being damaged from rain.

To this end, the present invention generally comprises a bin member being designed for receiving and storing charcoal. A dispensing assembly is coupled to the bin member. The dispensing assembly is designed for permitting charcoal to be dispensed from the bin member when the dispensing assembly is actuated by the user. A receiving member is selectively coupled to the bin member. The receiving member is in communication with the dispensing assembly whereby the receiving member is designed for receiving the charcoal dispensed by the dispensing assembly. The receiving member is designed for being carried by the user to dispense the charcoal into the grill.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
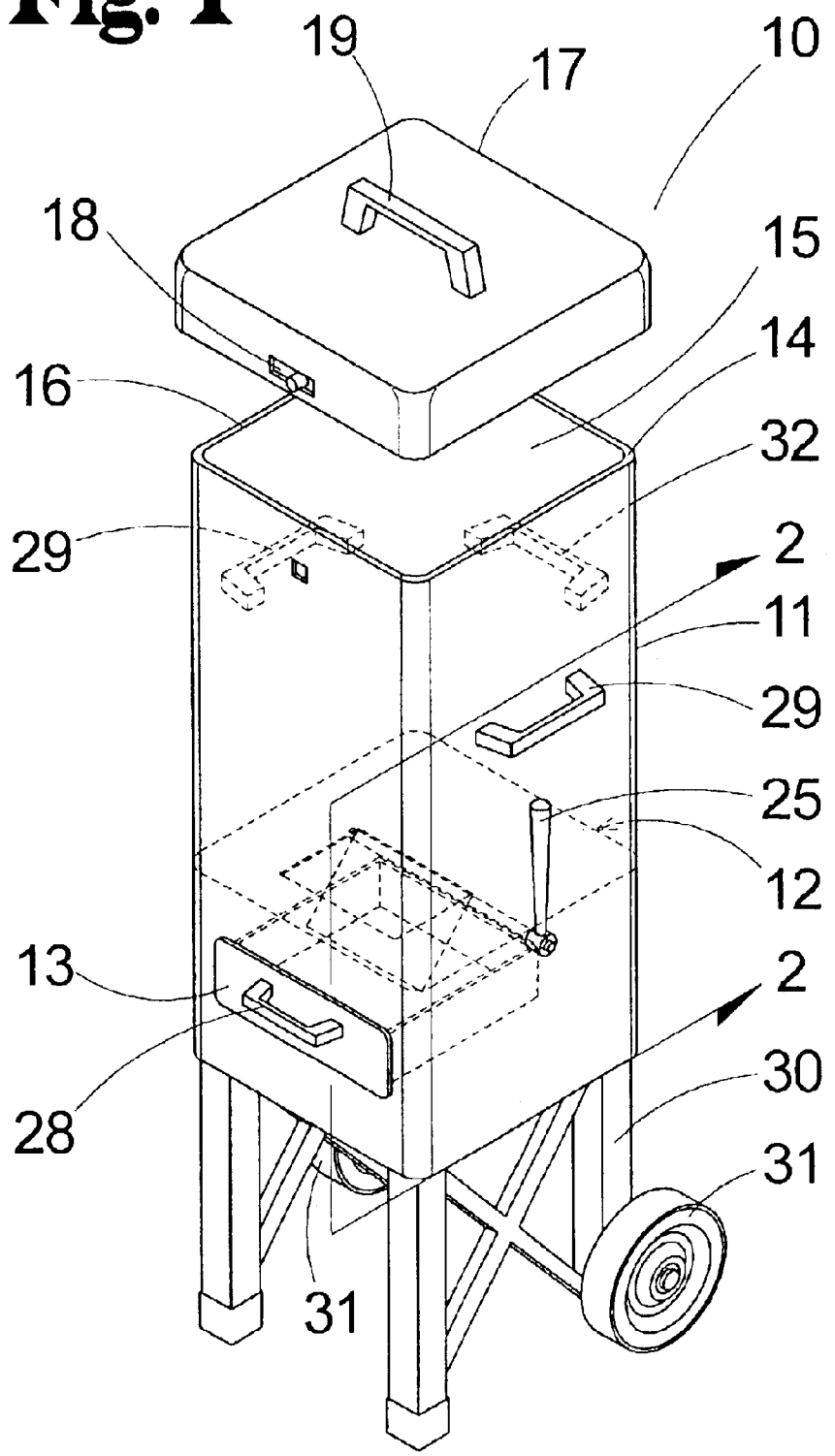
FIG. 1 is an exploded perspective view of a new charcoal dispensing system according to the present invention.
Figure 2:
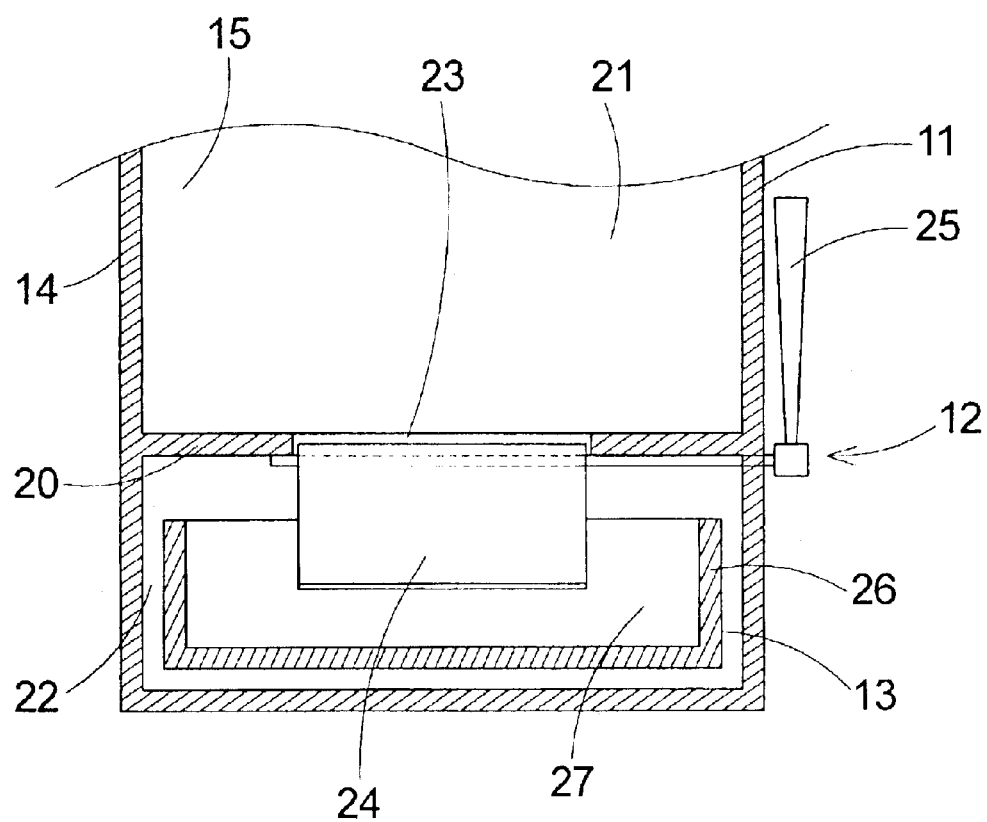
FIG. 2 is a cross-sectional view of the present invention taken along line 2—2 of FIG. 1.

With reference now to the drawings, and in particular to FIGS. 1 through 2 thereof, a new charcoal dispensing system embodying the principles and concepts of the present invention and generally designated by the reference numeral 10 will be described.

As best illustrated in FIGS. 1 through 2, the charcoal dispensing system 10 generally comprises a bin member 11 being designed for receiving and storing charcoal.

A dispensing assembly 12 is coupled to the bin member 11. The dispensing assembly 12 is designed for permitting charcoal to be dispensed from the bin member 11 when the dispensing assembly 12 is actuated by the user.

A receiving member 13 is selectively coupled to the bin member 11. The receiving member 13 is in communication with the dispensing assembly 12 whereby the receiving member 13 is designed for receiving the charcoal dispensed by the dispensing assembly 12. The receiving member 13 is designed for being carried by the user to dispense the charcoal into the grill.

The bin member 11 comprises a perimeter wall 14. The perimeter wall 14 defines an interior space 15 of the bin member 11. The interior space 15 of the bin member 11 comprises an open end 16 whereby the open end 16 of the interior space 15 is designed for permitting charcoal to be inserted into the interior space 15 of the bin member 11.

A lid member 17 selectively engages the bin member 11. The lid member 17 is positioned over the open end 16 of the interior space 15 of the bin member 11 whereby the lid member 17 is designed for inhibiting rain from entering the interior space 15 of the bin member 11 and soaking the charcoal stored in the interior space 15 of the bin member 11 when the lid member 17 engages the bin member 11.

A lock member 18 is operationally coupled to the lid member 17. The lock member 18 selectively engages the bin member 11 whereby the lock member 18 selectively secures the lid member 17 to the bin member 11 when the lid member 17 is coupled to the bin member 11. The lock member 18 is for inhibiting inadvertent removal of the lid member 17 from the bin member 11 and the charcoal spilling from the interior space 15 of the bin member 11 when the bin member 11 is accidentally tipped over.

A lifting handle 19 is coupled to the lid member 17 whereby the lifting handle 19 is positioned opposite the bin member 11 The lifting handle 19 is designed for being gripped by the user to allow the user to lift the lid member 17 and disengage the lid member 17 from the bin member 11 when the user wishes to access the interior space 15 of the bin member 11.

The dispensing assembly 12 comprises a partition plate 20 being positioned in the interior space 15 of the bin member 11. The partition plate 20 divides the interior space 15 of the bin member 11 into an upper space 21 and a lower space 22 whereby the partition plate 20 is positioned between the upper space 21 and the lower space 22. The partition plate 20 comprises a dispensing aperture 23 extending through the partition plate 20 whereby the dispensing aperture 23 is designed for permitting charcoal in the upper space 21 to be dispensed into the receiving member 13 positioned in the lower space 22 of the bin member 11.

The dispensing assembly 12 comprises a door member 24. The door member 24 is hingably coupled to the partition plate 20 whereby the door member 24 is for selectively closing the dispensing aperture 23. The door member 24 is designed for inhibiting dispensing of the charcoal from the upper space 21 to the lower space 22 when the door member 24 closes the dispensing aperture 23. The door member 24 is rotated away from the dispensing aperture 23 to allow charcoal to be dispensed from the upper space 21 when the door member 24 is actuated by the user.

The dispensing assembly 12 comprises a dispensing handle 25. The dispensing handle 25 is operationally coupled to the door member 24 whereby the dispensing handle 25 is for rotating the door member 24 with respect to the partition plate 20 when the dispensing handle 25 is actuated by the user. The dispensing handle 25 extends from the bin member 11 whereby the dispensing handle 25 is designed for being gripped by the user to facilitate actuating the dispensing handle 25 when the user wishes to dispense charcoal from the bin member 11. The dispensing assembly 12 may comprise a biasing member being operationally coupled to the dispensing handle 25 to return the dispensing handle 25 and pivot the door member 24 over the dispensing aperture 23 when the dispensing handle 25 is released by the user.

The receiving member 13 comprises a peripheral wall 26. The peripheral wall 26 defines a receiving space 27 of the receiving member 13. The receiving space 27 is designed for receiving charcoal from the bin member 11 when the charcoal is dispensed from the bin member 11.

The receiving member 13 comprises a transport handle 28. The transport handle 28 extends outwardly from the peripheral wall 26 whereby the transport handle 28 is designed for being gripped by the user to facilitate transporting of the charcoal in the receiving space 27 of the receiving member 13 to the grill.

A pair of carrying handles 29 are coupled to the bin member 11. Each of the carrying handles 29 is designed for being gripped by the user whereby the carrying handles 29 are for facilitating lifting and carrying of the bin member 11 by the user.

A frame member 30 selectively engages the bin member 11. The frame member 30 is designed for being positioned between the bin member 11 and a support surface whereby the frame member 30 is for supporting the bin member 11 above the support surface.

At least one wheel 31 is rotatably coupled to the frame member 30. The wheel 31 is designed for rolling across the support surface whereby the wheel 31 is for facilitating transporting of the bin member 11 and the frame member 30 across the support surface.

A tilting handle 32 is coupled to the bin member 11. The tilting handle 32 is designed for being gripped by the user whereby the tilting handle 32 is for facilitating tilting of the bin member 11 and the frame member 30 onto the wheel 31 to facilitate transporting of the bin member 11 and the frame member 30 across the support surface.

In use, the user removes the lid member 17 from the bin member 11 and pours charcoal into the interior space 15 of the bin member 11. The lid member 17 is then replace and the lock member 18 actuated to secure the lid member 17 to the bin member 11 so that the charcoal will not spill out of the bin member 11 should the bin member 11 be tipped over. The dispensing handle 25 is then actuated by the user which rotates the door member 24 and opens the dispensing aperture 23 and allows charcoal to be dispensed into the receiving space 27 of the receiving member 13. The transporting handle of the receiving member 13 is used to remove the receiving member 13 from the bin member 11 and to facilitate transporting of the receiving member 13 to the grill to allow the charcoal to be put into the grill.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A charcoal dispensing system for storing and dispensing charcoal to be used in a grill by a user, the charcoal dispensing system comprising:

a bin member being adapted for receiving and storing charcoal;

a dispensing assembly being coupled to said bin member, said dispensing assembly being adapted for permitting charcoal to be dispensed from said bin member when said dispensing assembly is actuated by the user;

a receiving member being selectively coupled to said bin member, said receiving member being in communication with said dispensing assembly such that said receiving member is adapted for receiving the charcoal dispensed by said dispensing assembly, said receiving member being adapted for being carried by the user to dispense the charcoal into the grill;

said bin member comprising a perimeter wall, said perimeter wall defining an interior space of said bin member, said interior space of said bin member comprising an open end such that said open end of said interior space is adapted for permitting charcoal to be inserted into said interior space of said bin member; and said dispensing assembly comprising a partition plate being positioned in said interior space of said bin member, said partition plate dividing said interior space of said bin member into an upper space and a lower space such that said partition plate is positioned between said upper space and said lower space, said partition plate comprising a dispensing aperture extending through said partition plate such that said dispensing aperture is adapted for permitting charcoal in said upper space to be dispensed into said receiving member positioned in said lower space of said bin member.

2. The charcoal dispensing system as set forth in claim 1, further comprising:

a lid member selectively engaging said bin member, said lid member being positioned over said open end of said interior space of said bin member such that said lid member is adapted for inhibiting rain from entering said interior space of said bin member and soaking the charcoal stored in said interior space of said bin member when said lid member engages said bin member.

3. The charcoal dispensing system as set forth in claim 2, further comprising:

a lock member being operationally coupled to said lid member, said lock member selectively engaging said bin member such that said lock member selectively secures said lid member to said bin member when said lid member is coupled to the bin member, said lock member being for inhibiting inadvertent removal of said lid member from said bin member and the charcoal spilling from said interior space of said bin member when said bin member is accidentally tipped over.

4. The charcoal dispensing system as set forth in claim 2, further comprising:

a lifting handle being coupled to said lid member such that said lifting handle is positioned opposite said bin member, said lifting handle being adapted for being gripped by the user to allow the user to lift said lid member and disengage said lid member from said bin member when the user wishes to access said interior space of said bin member.

5. The charcoal dispensing system as set forth in claim 1, further comprising:

said dispensing assembly comprising a door member, said door member being hingably coupled to said partition plate such that said door member is for selectively closing said dispensing aperture, said door member being adapted for inhibiting dispensing of the charcoal from said upper space to said lower space when said door member closes said dispensing aperture, said door member being rotated away from said dispensing aperture to allow charcoal to be dispensed from said upper space when said door member is actuated by the user.

6. The charcoal dispensing system as set forth in claim 5, further comprising:

said dispensing assembly comprising a dispensing handle, said dispensing handle being operationally coupled to said door member such that said dispensing handle is for rotating said door member with respect to said partition plate when said dispensing handle is actuated by the user, said dispensing handle extending from said bin member such that said dispensing handle is adapted for being gripped by the user to facilitate actuating said dispensing handle when the user wishes to dispense charcoal from said bin member.

7. The charcoal dispensing system as set forth in claim 1, further comprising:

said receiving member comprising a peripheral wall, said peripheral wall defining a receiving space of said receiving member, said receiving space being adapted for receiving charcoal from said bin member when the charcoal is dispensed from the bin member.

8. The charcoal dispensing system as set forth in claim 7, further comprising:

said receiving member comprising a transport handle, said transport handle extending outwardly from said peripheral wall such that said transport handle is adapted for being gripped by the user to facilitate transporting of the charcoal in said receiving space of said receiving member to the grill.

9. The charcoal dispensing system as set forth in claim 1, further comprising:

a pair of carrying handles being coupled to said bin member, each of said carrying handles being adapted for being gripped by the user such that said carrying handles are for facilitating lifting and carrying of said bin member by the user.

10. The charcoal dispensing system as set forth in claim 1, further comprising:

a frame member selectively engaging said bin member, said frame member being adapted for being positioned between said bin member and a support surface such that said frame member is for supporting said bin member above the support surface.

11. The charcoal dispensing system as set forth in claim 10, further comprising:

at least one wheel being rotatably coupled to said frame member, said wheel being adapted for rolling across the support surface such that said wheel is for facilitating transporting of said bin member and said frame member across the support surface.

12. The charcoal dispensing system as set forth in claim 11, further comprising:

a tilting handle being coupled to said bin member, said tilting handle being adapted for being gripped by the user such that said tilting handle is for facilitating tilting of said bin member and said frame member onto said wheel to facilitate transporting of said bin member and said frame member across the support surface.

13. A charcoal dispensing system for storing and dispensing charcoal to be used in a grill by a user, the charcoal dispensing system comprising:

a bin member being adapted for receiving and storing charcoal;

a dispensing assembly being coupled to said bin member, said dispensing assembly being adapted for permitting charcoal to be dispensed from said bin member when said dispensing assembly is actuated by the user;

a receiving member being selectively coupled to said bin member, said receiving member being in communication with said dispensing assembly such that said receiving member is adapted for receiving the charcoal dispensed by said dispensing assembly, said receiving member being adapted for being carried by the user to dispense the charcoal into the grill;

said bin member comprising a perimeter wall, said perimeter wall defining an interior space of said bin member, said interior space of said bin member comprising an open end such that said open end of said interior space is adapted for permitting charcoal to be inserted into said interior space of said bin member;

a lid member selectively engaging said bin member, said lid member being positioned over said open end of said interior space of said bin member such that said lid member is adapted for inhibiting rain from entering said interior space of said bin member and soaking the charcoal stored in said interior space of said bin member when said lid member engages said bin member;

a lock member being operationally coupled to said lid member, said lock member selectively engaging said bin member such that said lock member selectively secures said lid member to said bin member when said lid member is coupled to the bin member, said lock member being for inhibiting inadvertent removal of said lid member from said bin member and the charcoal spilling from said interior space of said bin member when said bin member is accidentally tipped over;

a lifting handle being coupled to said lid member such that said lifting handle is positioned opposite said bin member, said lifting handle being adapted for being gripped by the user to allow the user to lift said lid member and disengage said lid member from said bin member when the user wishes to access said interior space of said bin member;

said dispensing assembly comprising a partition plate being positioned in said interior space of said bin member, said partition plate dividing said interior space of said bin member into an upper space and a lower space such that said partition plate is positioned between said upper space and said lower space, said partition plate comprising a dispensing aperture extending through said partition plate such that said dispensing aperture is adapted for permitting charcoal in said upper space to be dispensed into said receiving member positioned in said lower space of said bin member;

said dispensing assembly comprising a door member, said door member being hingably coupled to said partition plate such that said door member is for selectively closing said dispensing aperture, said door member being adapted for inhibiting dispensing of the charcoal from said upper space to said lower space when said door member closes said dispensing aperture, said door member being rotated away from said dispensing aperture to allow charcoal to be dispensed from said upper space when said door member is actuated by the user;

said dispensing assembly comprising a dispensing handle, said dispensing handle being operationally coupled to said door member such that said dispensing handle is for rotating said door member with respect to said partition plate when said dispensing handle is actuated by the user, said dispensing handle extending from said bin member such that said dispensing handle is adapted for being gripped by the user to facilitate actuating said dispensing handle when the user wishes to dispense charcoal from said bin member;

said receiving member comprising a peripheral wall, said peripheral wall defining a receiving space of said receiving member, said receiving space being adapted for receiving charcoal from said bin member when the charcoal is dispensed from the bin member;

said receiving member comprising a transport handle, said transport handle extending outwardly from said peripheral wall such that said transport handle is adapted for being gripped by the user to facilitate transporting of the charcoal in said receiving space of said receiving member to the grill;

a pair of carrying handles being coupled to said bin member, each of said carrying handles being adapted for being gripped by the user such that said carrying handles are for facilitating lifting and carrying of said bin member by the user;

a frame member selectively engaging said bin member, said frame member being adapted for being positioned between said bin member and a support surface such that said frame member is for supporting said bin member above the support surface;

at least one wheel being rotatably coupled to said frame member, said wheel being adapted for rolling across the support surface such that said wheel is for facilitating transporting of said bin member and said frame member across the support surface; and a tilting handle being coupled to said bin member, said tilting handle being adapted for being gripped by the user such that said tilting handle is for facilitating tilting of said bin member and said frame member onto said wheel to facilitate transporting of said bin member and said frame member across the support surface.

* * * * *